(12) United States Patent
Hasel et al.

(10) Patent No.: US 8,632,051 B2
(45) Date of Patent: Jan. 21, 2014

(54) SOLENOID

(75) Inventors: Claus Peter Hasel, Memmingen (DE); Bernhard Schönmetzler, Bad Grönenbach (DE)

(73) Assignee: Firma SVM Schultz Verwaltungs-GmbH & Co. KB, Memmingen (DE)

(*) Notice: Subject to any disclaimer, the term of this patent is extended or adjusted under 35 U.S.C. 154(b) by 0 days.

(21) Appl. No.: 13/273,855

(22) Filed: Oct. 14, 2011

(65) Prior Publication Data

US 2013/0093548 A1    Apr. 18, 2013

(51) Int. Cl.
*H01F 7/08* (2006.01)
*F16K 31/02* (2006.01)

(52) U.S. Cl.
USPC ..................... 251/129.15; 335/270

(58) Field of Classification Search
USPC ..................... 251/129.15; 335/270
See application file for complete search history.

(56) References Cited

U.S. PATENT DOCUMENTS

| | | | |
|---|---|---|---|
| 4,488,574 A * | 12/1984 | Bartholomaus | 137/487.5 |
| 6,116,570 A * | 9/2000 | Bulgatz et al. | 251/129.1 |
| 6,328,065 B1 * | 12/2001 | Schmid et al. | 137/596.17 |
| 6,378,545 B1 * | 4/2002 | Bozkan et al. | 137/82 |
| 6,679,475 B2 * | 1/2004 | Rembold et al. | 251/129.14 |
| 6,840,495 B2 * | 1/2005 | Jahn et al. | 251/63.5 |
| 7,000,891 B2 * | 2/2006 | Rocca et al. | 251/129.01 |
| 7,347,172 B2 * | 3/2008 | Strickler et al. | 123/90.12 |
| 7,597,306 B2 * | 10/2009 | Strauss | 251/282 |
| 8,127,791 B2 * | 3/2012 | Najmolhoda et al. | 137/596.17 |
| 2002/0113219 A1 * | 8/2002 | Rembold et al. | 251/129.14 |
| 2003/0111622 A1 * | 6/2003 | Jahn et al. | 251/63.4 |
| 2006/0086915 A1 * | 4/2006 | Strauss | 251/63 |
| 2007/0138422 A1 * | 6/2007 | Najmolhoda et al. | 251/129.14 |
| 2010/0025606 A1 * | 2/2010 | Hoppe et al. | 251/129.15 |
| 2010/0180875 A1 * | 7/2010 | Meldolesi et al. | 123/70 R |

FOREIGN PATENT DOCUMENTS

| | | |
|---|---|---|
| DE | 1171282 | 5/1964 |
| DE | 1908082 | 1/1965 |
| DE | 2612300 A1 | 10/1976 |
| DE | 3616844 A1 | 11/1987 |
| DE | 3721208 A1 | 1/1989 |
| DE | 102007039148 A1 | 2/2009 |
| DE | 102008030454 A1 | 12/2009 |

* cited by examiner

*Primary Examiner* — Alexander Talpalatski
(74) *Attorney, Agent, or Firm* — McCormick, Paulding & Huber LLP

(57) ABSTRACT

A solenoid, in particular for media-controlling valves, includes in an armature space an armature movably acting on a tappet, and a coil carrying windings of a conductor. The magnetic core delimiting the armature space has a tappet boring that incorporates the axially moving tappet, and a boundary element, that consists of at least partly elastic material and is media- and liquid-proof, is provided between the tappet and the magnetic core. The boundary element includes a fastening area for a sealing connection of the boundary element with the tappet, a connection area for a sealing connection of the boundary element with the magnetic core, and an intermediate part provided between the fastening area and the connection area. The intermediate part surrounds at least part of the length of the tappet like a hose or sleeve.

14 Claims, 2 Drawing Sheets

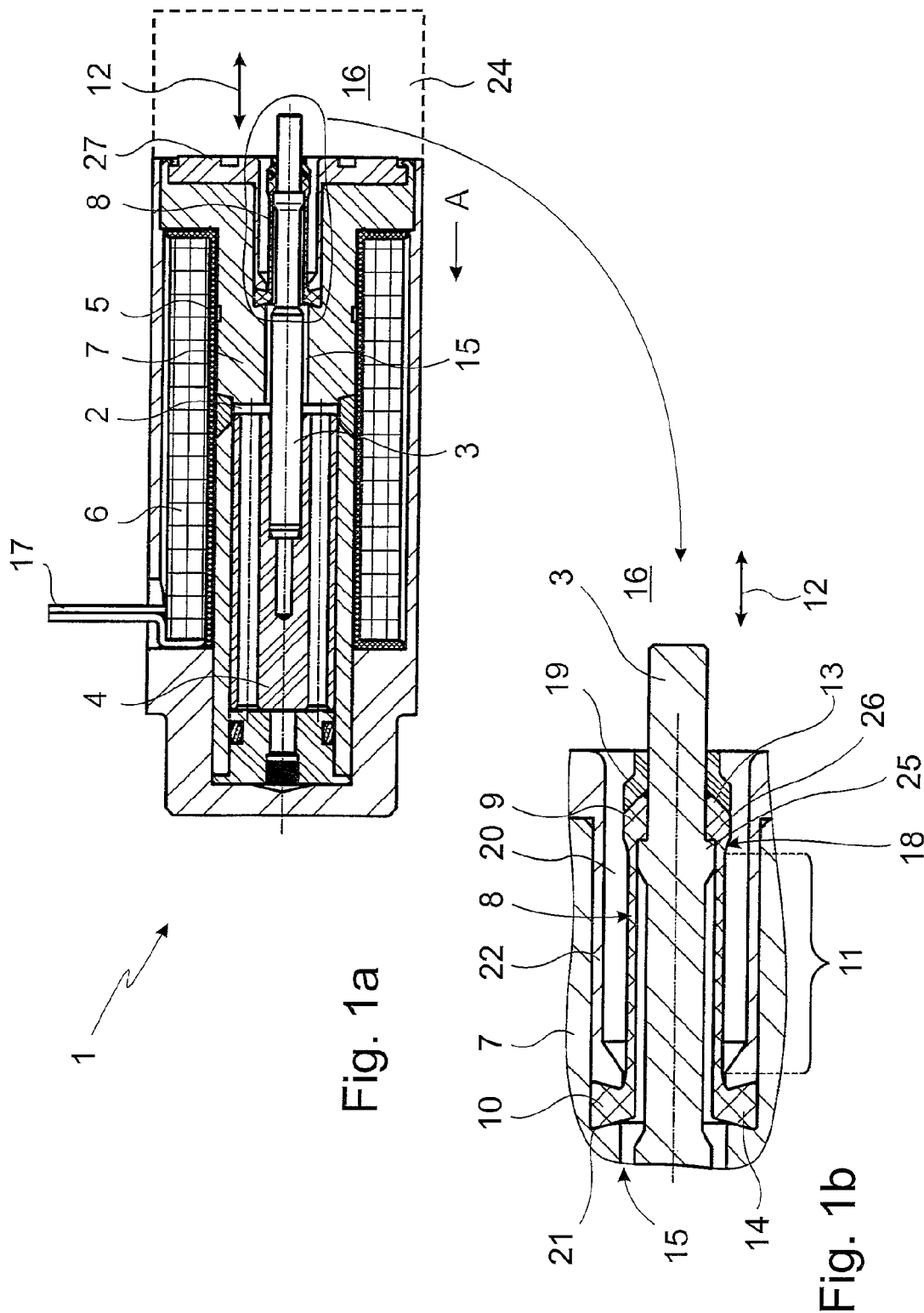

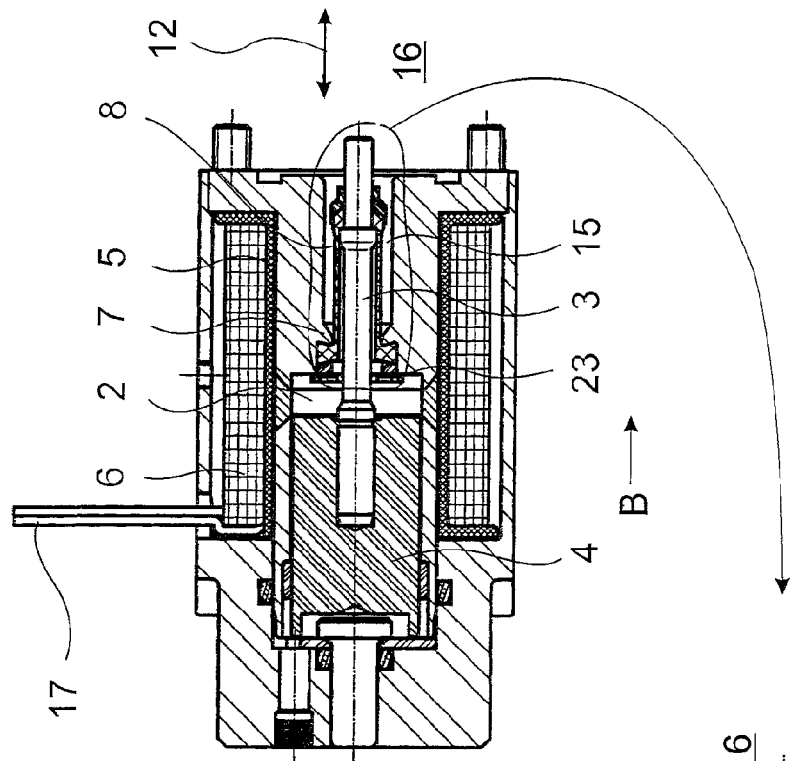
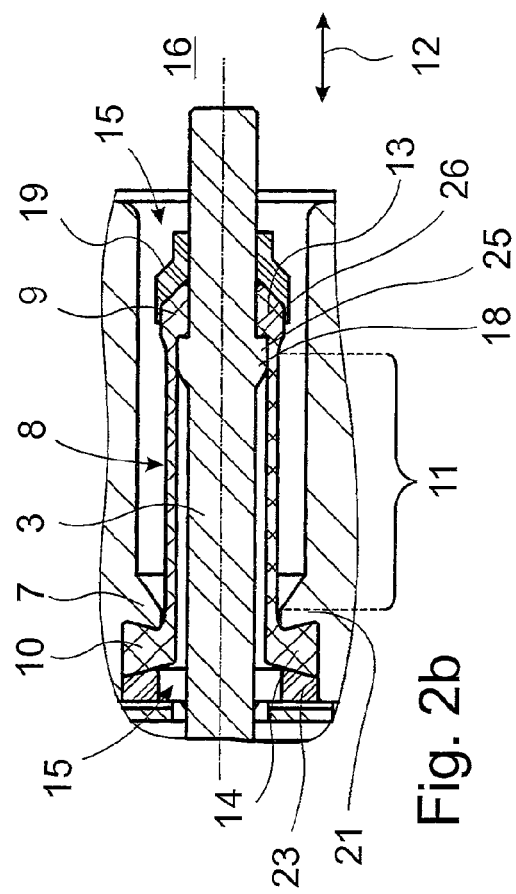
Fig. 2a
Fig. 2b

SOLENOID

FIELD OF THE INVENTION

The invention refers to a solenoid, in particular for media-controlling valves where in an armature space a mobile supported armature acting on a tappet and a coil carrying windings of a wire flown through by electricity are provided, and the magnetic core delimiting the armature space has a tappet boring incorporating the axially moving tappet, and a boundary element consisting at least partly of elastic material that is media- and liquid-proof, respectively, is provided between the tappet and the magnetic core.

BACKGROUND OF THE INVENTION

In the state of the art solenoids of this kind are sufficiently known, for example for operating valves. The range of use of the valves is often very different. They are used, for example, for controlling aggressive media flows (liquid or gas). What is often undesired here is that the aggressive medium (for example soiling in the medium, changed viscosity, the medium to be controlled is chemically incompatible with the material of the magnet, for example it dissolves it) gets in the armature space. Therefore, it is known to fill the armature space with defined liquid, and to provide a boundary element at a suitable point between the armature space and the valve space. In the state of the art a separating membrane is used as boundary element. By filling the armature space with an armature space liquid the pressure of the membrane is compensated, and the possibly considerable pressure stress of the solenoid (this may be, for example with hydraulic application cases, up to 200 bar and more) does not have any influence on the compressive strength of the solenoid.

In the known solutions the essentially disc-like separating membrane is fastened, on the one hand, to the tappet, and radial on the outside at the magnetic core, in particular in the tappet boring. The movement of the tappet, that is, on the one hand, caused by the electro-magnetic effect (the wire windings of the coil, flown through by electricity, generate a magnetic field that moves the armature in the armature space, and this movement is transferred to the tappet, or the restoring movement is carried out, for example, by a pole reversal of the solenoid, or by suitable mechanic elements, for example, a readjusting spring or the like), is here essentially rectangular to the plane, disc-like arrangement of the separating membrane. The stroke of a few tenths of millimeters, millimeters or up to 5-8 millimeters caused by the armature or tappet then has also to be carried out by the separating membrane in a suitable way, leading to a corresponding mechanic stress of the separating membrane. The known separating membranes consist here of elastic material, and it can be seen that the maximum deformation forms in the area of the smallest radius or the smallest cross section in the separating membrane, that means, the separating membrane is considerably stressed in particular in the fastening area at the tappet by a hinge-like movement. Furthermore, it has to be taken into consideration that the tappet movement is derived from the armature movement (the tappet is, for example, connected fixedly with the armature, or mounted floating on it with appropriate readjusting elements), and exchanging the tappet from the interior of the solenoid leads to a volume compensation in the armature space and the tappet boring necessarily connected with the armature space. This relative change of volume has to be compensated accordingly by the boundary element and leads to a compensation movement of the separating membrane. In the known arrangements the armature movement and the compensation movement of the separating membrane is in opposite direction. This leads to a considerably additional mechanic stress of the separating membrane by shearing forces leading to a significant reduction of the life, on the one hand, or to a restriction of the possible stroke, on the other hand.

Referring to this state of the art, it is the object of the present invention to overcome at least one of the beforementioned disadvantages.

BRIEF DESCRIPTION

In order to solve the problem of the invention, the invention refers to a solenoid as described in the beginning, and suggests that the boundary element comprises a fastening area for a sealing connection of the boundary element with the tappet, a connection area with a sealing connection of the boundary element with the magnetic core, and an intermediate part provided between the fastening area and the connection area, and the intermediate part surrounds at least part of the length of the tappet like a hose or sleeve.

In contrast to the separating membrane of the state of the art that is configured essentially planar as boundary element, now, in the solution according to the invention, a considerably modified configuration of the boundary element is suggested. The high light of the invention is the fact that in the boundary element an intermediate part is provided that surrounds at least part of the length of the tappet like a hose or a sleeve. Cleverly, the entire boundary element is manufactured in one piece from an elastomer, however, without restricting the invention to this. The intermediate part extends essentially parallel to the tappet, and is here accordingly stressed mechanically, when the tappet moves. An essential advantage of the invention is in particular the fact that the relative stress of the boundary element can be influenced by the length of the intermediate part, or the stroke of the solenoid according to the invention can be enlarged by lengthening the intermediate part. In the rather long intermediate part the position change of the tappet (its stroke), that has to be compensated, is distributed to a larger area. This has the consequence that the mechanical stress of the elastomer in the intermediate part is less. This fact can be used, of course, for realizing also solenoids with rather large stroke that can be employed in aggressive media, and wherein the armature space does not have to be impinged with these media.

The compensation movement of the membrane is now not carried out hinge-like and with an appropriate stress of the smallest diameter—that is the fastening area of the boundary element at the tappet—but preferably essentially in the intermediate part where also for this accordingly more elastic material is provided. The result of the suggestion according to the invention is, that the movement portions acting on the boundary element during the movement of the armature and the tappet, respectively, on the one hand, and the compensation movement for the volume, on the other hand, are steady. An elastic deformation occurs in the hose- or sleeve-like intermediate part of the boundary element, wherein during stretching this hose- or sleeve-like intermediate part the diameter of the intermediate part being is reduced, that is the intermediate part is in tighter contact with the tappet. During this movement, a part of the tappet emerges from the tappet boring, the sum of the volumes of the armature space and tappet boring, that can be filled with armature space liquid, would enlarge while the volume of the armature space liquid remains the same, what is compensated by the tighter fit of the intermediate part.

The compensation movement occurring in the modification according to the invention, however, is not contra-directional to the movement of the armature, and does not lead to an additional mechanic stress of the boundary element. The elastic deformation is distributed quite uniform to the hose- or sleeve-like intermediate part of the boundary element. This increases the life considerably as the constructive weaknesses of the solutions of the state of the art are avoided completely, and, at the same time, the solenoid according to the invention reaches faster switching times while the basic conditions remain the same. The resistances to be overcome are in addition clearly smaller. Also the durability of the suggestion according to the invention is improved considerably, the solenoid according to the invention achieves clearly higher switching numbers.

In a preferred embodiment of the invention it is provided that the intermediate part is arranged essentially parallel or coaxially to the tappet. A configuration of this type makes it possible that the material stress in the intermediate part is as low as possible, and no shearing forces and so on occur that are responsible for a clear reduction of life of the solutions of the state of the art. Because of the hose- or sleeve-like configuration of the intermediate part, also the fastening area as well as the connection area are shifted axially—with reference to the longitudinal extension of the tappet or its direction of movement—, and the magnetic core provided for the magnetic guide incorporates in a space-saving way, for example, in the interior the connection area of the boundary element for fastening purposes.

In an advantageous configuration of the suggestion it is provided, that the intermediate part has a length of at least one, preferably at least two, in particular at least three diameters of the tappet boring. It is provided here in the same way, that the intermediate part has a length of at least one, preferably at least two, in particular at least three diameters of the tappet boring or the widening to the tappet boring. It is provided here, that the intermediate part comprises preferably at least five or at least ten, at least 20, at least 30, at least 50 or at least 70 or 80 percent of the thickness of the magnetic core. The thickness of the magnetic core is here defined by the distance of the valve space to the armature space between which the magnetic core is located in the construction. The magnetic core can take over here also a supporting function for the tappet, alternatively, however, the tappet is also guided axially either in the armature itself or in an assembly provided in the valve. The advantage of the different, possible lengths of the intermediate part, surrounding the tappet like a hose or sleeve, is the fact that by means of this the boundary element suggested according to the invention can be adjusted to the respective characteristics of the solenoid. When the solenoid is stressed strongly, for example because of high switching numbers and/or a large stroke, a rather long intermediate part will be chosen in the boundary element.

In a clever way the suggestion achieves that a movement of the tappet stresses, that means loads or guides mechanically, the material of the intermediate part parallel to the direction of the tappet movement. A flexing or hinge movement is avoided by the suggestion, and this contributes decisively to an appropriate increase of the life.

When the hose-like area is lengthened, for example to a multiple (2, 3, 4, 5, 6 or 7 times of the tappet diameter or tappet boring diameter, or a part of more than 20% of the thickness of the magnetic core), also large magnetic strokes, that is large strokes of the tappet, when the stretching percents, in particular of the intermediate part of the boundary element, remain the same, can be realized.

Preferably a homogenous, uniform wall thickness of the intermediate part is used that results in—seen in the direction of the circumference—a behaviour of the boundary element as steady as possible that stresses the support and guide elements of the tappet in a uniform way. At the same time, the homogenous, uniform cross section also contributes to a homogenous, steady stress of the intermediate part.

Preferably, it is provided as an alternative, that the cross section of the intermediate part, seen in longitudinal direction, is homogenous and uniform, wherein this characteristic refers to the either non-switched or switched condition of the solenoid, and does not describe the situation of the compensation movement. In unstressed, not-guided condition of the boundary element a homogenous uniform cross section of the intermediate part is again convenient for a steady stress of the intermediate part and the resulting life span of the entire solenoid suggested according to the invention.

Preferably, the fastening area is designed as ring, bead or ring bead protruding inwards compared with the intermediate part. The connection area, provided for a sealed connection of the boundary element with the magnetic core, is configured as flange or ring flange protruding outward compared with the intermediate part. Because of specific changes of the respective material thickness—in radial as well as in axial direction—it is effected that, on the one hand, the ring bead or ring, on the other hand, the flange or the ring flange, can be defined in a suitable way at the corresponding elements, and because of the resulting "stiffer" configuration, lengthening or stretching of the boundary element during the movement of the tappet is essentially guaranteed by the intermediate part, that is optimized, as described, for this task.

According to the suggestion, a number of different connection modifications is provided for a sealing and mechanically stressed connection, on the one hand, of the connection area with the magnetic core, on the other hand of the connection area with the tappet. Besides strictly mechanically acting connection options, such as for example a press or clamping connection, however, also material connections can be employed such as welding or vulcanizing connections or a gluing connection, where also an additional layer can be provided for the connection. By arranging a fastening collar or fastening groove at the tappet, the fastening point during mounting the boundary element can be defined exactly. At the same time, a fastening collar or a fastening groove also serves as counter bearing, for example in a press or clamping connection.

The same goes for the connection of the connection area in the tappet boring, or a widening provided at the tappet boring on the side opposite the armature space serving for incorporating the intermediate part. Thus, for example, in the tappet boring or the widening a connection collar or a connection groove is provided for fastening the connection area.

Cleverly, the boundary element, provided according to the invention, is manufactured in one piece, and consists each time on the end side of the fastening area and the connection area that hold between each other the sleeve- or hose-like intermediate part. Basically, it is provided in the frame of the invention, that the boundary element has a fastening area and an end area consisting of a separate element, that have between each other the essentially elastic intermediate part. In this case, the boundary element consists at least partly of elastic material. In this respect, it is also provided, according to the invention, that the boundary element consists of several parts that have been manufactured separately and are assembled after that in an appropriate way. Thus, it is basically also possible that the boundary element does not only consist of homogenous identical material, but the boundary element has material qualities that are optimized to the respective field of application, and is therefore heterogeneous in this regard.

Preferably, the boundary element is manufactured of an elastomer or thermoplastic elastomer. These may be, for example, the following materials:
Hydrated acrylonitril-butadiene rubber (HNBR)
Acrylonitrile-butadiene rubber (NBR)
Silicone rubber (VMQ)
Fluorsilicone rubber (FVMQ)
Ethylene-propylene-diene rubber (EPDM)
Fluor-polymere rubber (FPM, FKM)
Polytetrafluor ethylene (PTFE)
Thermoplastic elastomers (TPE)
Acrylate rubber (ACM)
Chloroprene rubber (CR)
Ethyleneacrylate rubber (AEM)
Perfluorinated rubber (FFKM)
Polyester urethane rubber (AU)
Styrene-butadiene rubber (SBR)
Natural rubber (NR)

BRIEF DESCRIPTION OF THE DRAWINGS

In the drawing the invention is shown schematically, in particular in an embodiment. In the figures:

FIG. 1a and FIG. 2a each show in a sectional view different modifications of the solenoid according to the invention FIG. 1b and FIG. 2b each show detailed views of the tappet boring provided in the solenoid.

In the figures identical or corresponding elements each are referred to by the same reference numbers, and therefore are, if not useful, not described anew.

DETAILED DESCRIPTION OF THE PREFERRED EMBODIMENT

The solenoid according to the invention is shown in the figures schematically in different modifications. The solenoid 1 shown in FIGS. 1a and 1b serves in particular for controlling a valve 24. The solenoid 1 has an armature space 2 in which a mobile supported armature 4 is provided. This armature 4 acts on a tappet 3 connected with the armature 4 fixedly or floating. The armature space 2 is surrounded by a coil 5 that can be electrified and that carries the windings of a wire that can be flown through by electricity. When the solenoid is operated, the coil 5 generates a corresponding magnetic field that causes the movement of the armature 4 and thus of the tappet 3. According to the generated magnetic field, the armature 4 is shifted axially so that then the operation, that is, in the simplest form, opening or closing of the valve 24, is carried out. The magnetic core 7 is connected to the armature space 2, and limits it in the direction of the valve 24 associated with the solenoid 1. The magnetic core 7 has a tappet boring 15 incorporating the axially movable tappet 3.

The solenoid 1 shown in respectively preferred embodiments in FIGS. 1a and 2a serves for controlling a valve 24. Such a valve 24 can be used, for example, for controlling aggressive or corrosive media. In order to prevent the media controlled by the valve 24 from penetrating in the solenoid 1, and thus in particular in the armature space 2 and causing here soiling and corrosion, a boundary element 8 is provided. This boundary element 8 is formed of elastic material, and extends axially to the tappet 3 in the tappet boring 15. By means of the boundary element 8 a liquid-proof sealing of the armature 2 towards the valve 24 operated by the solenoid 1 can be reached. The boundary element 8 surrounds the part of the tappet 3 that is in direct active connection with the valve 24 in the way of a sleeve or a hose. Because of the elastic quality of the boundary element, this can be stretched or compressed by moving the tappet in the direction 12 of tappet movement, and can guarantee a permanent sealing. FIGS. 1a and 2a show the part of the tappet 3 that is in direct active connection with the valve 24, as well as the boundary element 8 surrounding it. The boundary element 8 surrounds the tappet like a hose or a sleeve. The fastening element 8 has, on the one hand, a fastening area 9 that is in connection with the tappet 3 and that is in tight, liquid-proof contact with the tappet 3. On the other hand, at the boundary element 8 a connection area 10 is provided that is connected with the magnetic core 7. Here a liquid-proof connection of boundary element 8 and magnetic core 7 is provided.

A radial projection 25, forming a shoulder 26, that is in engagement with the fastening area 9, is provided at the tappet. The fastening area 9 is formed as bead-like thickening of the boundary element 8 in the example of FIGS. 1b and 2b. It extends, compared with the intermediate part 11 of the boundary element radial in the direction towards the tappet 3. In order to guarantee securing the fastening area 9, and to prevent the fastening area 9 from being detached from the radial projection 25, a clamping ring 19 is provided. This is slipped on the tappet 3 after arranging the boundary element 8 in the magnetic core 7 and after or during introducing the tappet 3 in the boundary element 8, and secures the boundary element or the fastening area 9 against an unintended slipping-off of the tappet 3.

The radial projection 25 extends axially to the direction of movement of the tappet in the direction of the armature 4, and forms a encircling fastening collar 18 to which a part of the boundary element 8 is in tight contact. The fastening collar has in its further course a chamfer that runs toward a taper of the diameter of the tappet 3. The end of the tappet 3 projecting beyond the magnetic core extends into a valve 24 that is connected to the solenoid 1 in the direction 12 of the tappet movement, and operates it. The tappet 3 is guided through the tappet boring 15 in the magnetic core 7, and is there in connection with the armature 4 (see FIGS. 1a and 2a).

The essential functional parts of the solenoids 1 shown in FIGS. 1a and 2a correspond with each other. Both have a cable 17 arranged laterally at the magnet housing that supplies the coil 6 with power. Also the rest of the solenoids, the way of function of which is known, correspond with each other. However, the solenoids 1 shown in FIGS. 1a and 2b differ in the way of assembling the boundary element 8 and the magnetic core 7, respectively. In the embodiment, as shown in FIG. 1a, first of all a solenoid 1 is provided where the magnetic core 7 has already be set in the position shown in FIG. 1a. The tappet 3 is also here already in the tappet boring 15 and exceeds the magnetic core or the tappet boring 15 provided in it. In an assembling step, the boundary element 8 is slid on the tappet 3 and put in the magnetic core 7. To secure the connection collar 21, that is in contact with the magnetic core 7, then a cover plate 27 is put on the magnetic core 7. This cover plate has a sleeve-like extension configured as clamping sleeve 22 that projects in the tappet boring 15 and is in contact with the connection collar 21. This creates, after connecting the cover plate 27, a clamping safety device for the boundary element 8 in the tappet boring 15 or at the magnetic core 7. The boundary element 8 or its center part 11 extends at the section of the tappet 3 exceeding the tappet boring 15 along parallel to it, and ends in the bead-like designed ring 13 that is in engagement with the fastening collar 18 or the radial projection 25, and prevents the boundary element 8 from slipping off the tappet. An additional safety is created by the clamping ring 19 that is also slid on the tappet 3, and defines the ring 13 at the tappet 3 or presses or jams it together with this.

In contrast to that, assembling of the solenoid 1 shown in FIG. 2a is carried out in such a way that an assembly comprising the tappet 3 with joined boundary element 8 is provided. This is put in the magnetic core 7 through the tappet boring 15, and, after that, secured with the clamping disc 23. In the magnetic core 7 a connection collar 21 is provided for this purpose on which the flange 14, arranged at the boundary element 8 and forming also its connection area 10, is supported. An additional safety is reached here by putting-on the clamping disc 23. This prevents the connection area 10 from slipping off the connection collar 21. At the tappet 3 itself the intermediate part 11 of the boundary element 8 extends coaxially to it along the tappet 3, and grips over the fastening collar 18 provided at the tappet 3 that is also configured with a radial projection 25 and a shoulder 26 with which the ring 13 or the fastening area 9 of the boundary element 8 is in engagement. On the side of the tappet the boundary element 8 is secured by a clamping ring 19, already described in connection with FIG. 1b. In this example, a clamping sleeve 22, as shown in connection with FIG. 1b, is not provided and not necessary in order to carry out a securing of the boundary element 8. Mounting the boundary element 8 is done here in direction of arrow B, while in the example of FIG. 1 mounting is done in direction of arrow A.

FIGS. 1b and 2b show detailed views of the boundary element 8 that has been put in the tappet boring 15. The boundary element 8 is in both shown embodiments connected with the tappet 3 via a clamping connection. A clamping connection is also provided between the magnetic core 7 and the connection area 10 of the boundary element 8.

The boundary element 8 shows an intermediate part 11 besides the connection area 10, that is in engagement with the magnetic core 7, and besides the fastening area 9 that is in contact or in engagement with the tappet 3. The intermediate part 11 is arranged essentially parallel or coaxially to the tappet 3. In order to provide a sufficient sealing function and to create sufficient space for stretching the intermediate part 11 or for a sufficient enlargement of the area of the tappet boring 15 that can be flown through by fluid, the intermediate part 11 has a length corresponding with three tappet diameters. When the tappet 3 moves in the direction 12 of the tappet movement, the boundary element 8 manufactured from elastic material is stretched. Simultaneously, the diameter is radial reduced by lengthening the boundary element 8. Thus the boundary element 8 or its center part 11 moves in the direction of the tappet 3. Because of the design of the boundary element 8 as sleeve or hose or hose section, the reduction of diameter is uniform. Thus the wall thickness is reduced uniformly over the entire intermediate part 11 when the boundary element 8 is stretched. At the same time the radial diameter reduction of the boundary element 8 enlarges the space provided for the medium flowing in the tappet boring 15.

When the tappet 3 moves in reverse direction, the boundary element 8 is shortened and the tappet 3 recedes, that means the diameter of the boundary element 8 is radial enlarged. This additionally presses the fluid penetrated in the tappet boring 15 out of it.

The boundary element 8 has in the embodiment a bead- or ring-shaped fastening area 9. This projects, compared with the center part 11, radial inwards, that means it extends radial in the direction of the tappet 3. The connection area 10 of the boundary element 8 is at the end of the intermediate part 11 opposite the fastening area 9, and is configured as flange 14 protruding radial outwards, compared with the intermediate part 11. The flange 14 is here annularly arranged around the intermediate part 11, and has a shaping corresponding with the connection collar 21, so that here the connection collar 21 reaches partially behind the flange 14. In order to put in the boundary element 8, it is slid from below, that is in arrow direction A (see FIG. 1a), in the magnetic core 7.

In contrast to this, in the embodiment shown in FIG. 2b, the assembly consisting of tappet 3 with boundary element 8 arranged at it, is slid in from the side of the armature in the direction of arrow B (see FIG. 2a) in the magnetic core 7, and, after that, secured with the clamping disc 23. The embodiment shown in FIG. 2b has the advantage that here the assembly, consisting of armature 4, tappet 3 and boundary element 8, can be provided as one assembly that only has to be inserted in the magnetic core 7 or the assembly comprising the magnetic core 7.

In order to secure in the embodiment shown in FIG. 1a the boundary element 8 and a fluid-proof arrangement of the boundary element 8 in the tappet boring 15 or in the magnetic armature 7, here an additional cover plate 27 is provided comprising a clamping sleeve 22 that is brought into engagement with the connection area 10 of the boundary element 8, and secures the boundary element 8 in the tappet boring 15 or in the magnetic core 7 against unintended falling out. At the same time, this ensures the fluid-proof sealing. The cover plate 27 is additionally secured in the magnetic core 7, for example by a clamping, catching, screw or other appropriate connection.

In the example, the boundary element 8 is made of an elastomer and dimensioned in such a way that a high number of switching operations can be carried out without symptoms of fatigue or embrittlement occurring at the boundary element 8. The elastomer material is also resistant against aggressive or corrosive media that are controlled with the valve 24 joining the solenoid 1.

Besides the options of arranging the boundary element 8 or the grip of fastening area 9 across a fastening collar provided at the tappet 3 shown in FIGS. 1b and 2b there is also the option of providing a groove here in which the widened ring of the fastening area 9 engages. Furthermore, all other ways of fastening known to a person skilled in the art can be realized in the same way here.

In FIGS. 1a and 2a, as well as in FIGS. 1b and 2b, the solenoid 1 is shown in the basic position, that means that the boundary element 8 is not stretched or lengthened. If the solenoid 1 is electrified, the armature 4 shifts in the armature space 2. Thus the tappet 3 is introduced further in the tappet boring 15 and projects over the magnet housing more than shown in the figures. Because of the fact that the boundary element 8 is defined in the magnetic core 7, this is stretched or lengthened. Thus, a stress of the boundary element 8 occurs in longitudinal direction. However, there is no stress in a direction that is vertical or essentially vertical to it, so that there is no double impingement of the elastomer material here. This contributes to a long life of the boundary element 8, and thus to an increased operation period of the entire solenoid 1. Additionally, assembling the solenoid becomes easier as the boundary element 8 is provided as molded part that can be introduced or inserted in a simple way in the tappet boring 15.

Although this invention has been shown and described with respect to the detailed embodiments thereof, it will be understood by those skilled in the art that the detailed embodiments are merely exemplary illustrations of the inventive concept, and that various changes in form and detail thereof may be made without departing from the spirit and the scope of the invention.

The invention claimed is:

1. A solenoid for use in media-controlling valves, comprising:
   a magnetic core delimiting an armature space and defining a tappet boring extending axially with reference to the armature space;
   a tappet housed axially movably within the tappet boring;
   an armature movably supported in the armature space and acting on the tappet;
   a coil carrying windings of a conductor around the magnetic core; and
   a media-or liquid-proof boundary element consisting at least partly of elastic material provided between the tappet and the magnetic core,
   wherein the boundary element (8) comprises a fastening area (9) for a sealing rigid attachment of the boundary element (8) with the tappet (3), a connection area (10) for a sealing rigid attachment of the boundary element (8) with the magnetic core (7), and an intermediate part (11) provided between the fastening area (9) and the connection area (10), and the intermediate part (11) surrounds at least part of the length of the tappet (3) like a hose or a sleeve, wherein movement of the tappet in a first direction elongates and radially reduces the size of the intermediate part of the boundary element, and movement of the tappet in a reverse direction shortens and radially enlarges the size of the intermediate part of the boundary element.

2. A solenoid according to claim 1, wherein the intermediate part (11) is arranged essentially parallel or coaxially to the tappet (3).

3. A solenoid according to claim 1, wherein the intermediate part has the length of at least one, preferably at least two, in particular at least three tappet diameters.

4. A solenoid according to claim 1, wherein during a movement of the tappet (3) the intermediate part (11) is stressed or lengthened essentially parallel to the direction of the tappet movement (12).

5. A solenoid according to claim 1, wherein a homogenous, consistent wall thickness of the intermediate part (11) is provided.

6. A solenoid according to claim 1, wherein a cross section of the intermediate part (11) is provided that is homogenous, consistent seen in longitudinal direction.

7. A solenoid according to claim 1, wherein the fastening area (9) is configured as, compared with the intermediate part (11), inwards protruding ring (13) or bead or ring bead.

8. A solenoid according to claim 1, wherein the connection area (10) is configured as, compared with the intermediate part (11), outwards protruding flange (14) or ring flange.

9. A solenoid according to claim 1, wherein the armature space (2) can be filled with an armature space liquid.

10. A solenoid according to claim 1, wherein a pressing, clamping, vulcanizing, gluing, or welding connection is provided for fastening the fastening area (9) to the tappet (3), or the connecting area (10) to the magnetic core (7).

11. A solenoid according to claim 1, wherein the tappet (3) has a fastening collar (18) or a fastening groove for fastening the fastening area (9).

12. A solenoid according to claim 1, wherein the tappet boring (15) has on the side opposite the armature space (2) a widening (20) for incorporating the intermediate part (11).

13. A solenoid according to claim 1, wherein a widening (20) is provided outward from the tappet boring, and in the tappet boring (15) or the widening (20) a connection collar (21) or a connection groove is provided for fastening the connection area (10).

14. A solenoid according to claim 1, wherein the boundary element (8) consists of an elastomer or a thermoplastic elastomer, in particular, for example, of silicone, synthetic caoutchouc, fluorine silicone caoutchouc or the like.

* * * * *

UNITED STATES PATENT AND TRADEMARK OFFICE
CERTIFICATE OF CORRECTION

PATENT NO. : 8,632,051 B2
APPLICATION NO. : 13/273855
DATED : January 21, 2014
INVENTOR(S) : Claus Peter Hasel and Bernhard Schonmetzler Page 1 of 1

It is certified that error appears in the above-identified patent and that said Letters Patent is hereby corrected as shown below:

Title Page item (73) Assignee:

from:   Firma SVM Schultz Verwaltungs-GmbH & Co. KB to:     Firma SVM Schultz Verwaltungs-GmbH & Co. KG Signed and Sealed this
Twenty-sixth Day of August, 2014

Michelle K. Lee
*Deputy Director of the United States Patent and Trademark Office*